(12) United States Patent
Yamanouchi et al.

(10) Patent No.: US 8,187,408 B2
(45) Date of Patent: May 29, 2012

(54) METHOD OF FORMING PRECISION MICROSPACE, PROCESS FOR MANUFACTURING MEMBER WITH PRECISION MICROSPACE, AND PHOTOSENSITIVE LAMINATED FILM

(75) Inventors: Atsushi Yamanouchi, Kanagawa (JP); Koichi Misumi, Kanagawa (JP); Takahiro Senzaki, Kanagawa (JP); Koji Saito, Kanagawa (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 562 days.

(21) Appl. No.: 12/304,974

(22) PCT Filed: Jun. 14, 2007

(86) PCT No.: PCT/JP2007/062044
§ 371 (c)(1),
(2), (4) Date: Dec. 15, 2008

(87) PCT Pub. No.: WO2007/148606
PCT Pub. Date: Dec. 27, 2007

(65) Prior Publication Data
US 2009/0173433 A1 Jul. 9, 2009

(30) Foreign Application Priority Data
Jun. 21, 2006 (JP) ................................ 2006-171786
Jun. 21, 2006 (JP) ................................ 2006-171787

(51) Int. Cl.
*B32B 37/00* (2006.01)
*B29C 65/00* (2006.01)
(52) U.S. Cl. ......... 156/292; 156/145; 156/312; 156/358

(58) Field of Classification Search ................. 156/130, 156/537, 455, 208, 288, 380.9, 389, 391, 156/145, 292, 312, 358; 29/890.1, 25.35, 29/832, 831, 830; 347/63, 47, 68, 65, 70, 347/67
See application file for complete search history.

(56) References Cited

U.S. PATENT DOCUMENTS
2005/0035999 A1* 2/2005 Kitahara et al. ................. 347/47
(Continued)

FOREIGN PATENT DOCUMENTS
JP       S60-190363       9/1985
(Continued)

OTHER PUBLICATIONS
Official Action issued in corresponding Taiwanese Patent Application No. 96122177, mailed May 26, 2010.
(Continued)

*Primary Examiner* — Khanh P Nguyen
*Assistant Examiner* — Carson Gross
(74) *Attorney, Agent, or Firm* — Knobbe Martens Olson & Bear LLP (57) ABSTRACT

A method of forming a precision microspace with given configuration and volume; a process for manufacturing a member having a precision microspace with given configuration and volume; etc. There is provided a method of forming a precision microspace by the step of laying a film on a substratum having a precision microscopic depressed portion, comprising the steps of mounting such a substratum on a first stage and setting a second stage covering the outer circumference of the first stage so that the uppermost face of the second stage is higher than that of the first stage; and laying a film on the substratum to thereby obtain a precision microspace with given configuration and volume.

13 Claims, 7 Drawing Sheets

U.S. PATENT DOCUMENTS

2007/0269738 A1* 11/2007 Itagaki et al. .............. 430/270.1
2008/0100665 A1* 5/2008 Sagara et al. .................. 347/47

FOREIGN PATENT DOCUMENTS

| JP | H09-288974 | 11/1997 |
| JP | H11-342607 | 12/1999 |
| JP | 2000-208062 | 7/2000 |
| JP | 2000-255069 | 9/2000 |
| JP | 2001-63052 | 3/2001 |
| JP | 2003-50463 | 2/2003 |
| JP | 2005-131949 | 5/2005 |
| JP | 3770898 B1 | 4/2006 |
| JP | 2006-142509 | 6/2006 |
| WO | WO 2006011548 A1 * | 2/2006 |

OTHER PUBLICATIONS

The International Search Report issued for corresponding PCT No. PCT/JP2007/062044.
Notice of Reasons for Rejection issued in Japanese Application No. 2006-171786 mailed Jul. 26, 2011.
Notice of Reasons for Rejection issued in Japanese Application No. 2006-171787 mailed Jul. 26, 2011.

* cited by examiner

METHOD OF FORMING PRECISION MICROSPACE, PROCESS FOR MANUFACTURING MEMBER WITH PRECISION MICROSPACE, AND PHOTOSENSITIVE LAMINATED FILM

RELATED APPLICATIONS

This application is the U.S. National Phase filing under 35 U.S.C. §371 of PCT/JP2007/062044, filed Jun. 14, 2007, which designated the United States and was published in a language other than English, which claims priority under 35 U.S.C. §119(a)-(d) to Japanese Patent Application Numbers 2006-171786 and 2006-171787, both of which were filed on Jun. 21, 2006. The content of these applications is incorporated herein by reference in their entireties.

TECHNICAL FIELD

The present invention relates to a method of forming a precision microspace by way of laying a film on a substratum having a precision microscopic depressed portion; a process for manufacturing a member having a precision microspace; and a photosensitive laminated film covering a substratum having a precision microscopic depressed portion; more specifically, to a method of forming a precision microspace that includes setting the uppermost face of the stage covering the outer circumference of the substratum to be higher than the uppermost face of the stage on which the substratum is mounted, and laying a film on the substratum; a method of forming a precision microspace, in which laying is carried out with constant control of the pressure per unit contact area at the contacting portion where the substratum and the film contact; a process for manufacturing a member having a precision microspace; and a photosensitive laminated film to be laid on the substratum having a precision microscopic depressed portion for a top board.

BACKGROUND ART

In recent years, a technology has been attracting attention in industrial fields in which a wide variety of functions are induced by way of forming a precision microspace into various products and then forming members with the microspace. For example, a technology has been developed in which a precision microspace is constructed into semiconductor devices and an air layer, existing in the space, is utilized as a dielectric layer; and technologies of liquid-ejecting devices etc. have been developed in which a large number of precision microspaces are formed, electrical or thermal pressure-generating elements are inserted into them, and liquids such as inks, filled into the precision microspace, are quantitatively and continuously ejected.

In regards to methods of forming the precision microspace, for example, Patent Document 1 discloses a method of forming a continuous precision microspace of an ink pool to supply an ink to an ink-pressure chamber, in which the precision microspace is formed by way of laminating a plurality of plate-like members, into which small and large pores are formed to form side walls of respective spaces, and consolidating them by an adhesive.

In addition, for example, Patent Document 2 discloses a method of forming an ink pressure chamber by way of forming a metal layer on a resin film, removing intermittently the metal layer using sandblast and etching treatment, and adhering a plate member so as to surround the resulting depressed portion.

[Patent Document 1] Japanese Patent Application Laid-Open No. 2001-63052 A
[Patent Document 2] Japanese Patent Application Laid-Open No. HEI 11-342607 A

DISCLOSURE OF THE INVENTION

Problems to be Solved by the Invention

However, there exists a problem in conventional methods of forming a precision microspace that the number of production steps is great since the number of parts in use is large and production accuracy is strict. Furthermore, selectability for useful materials is narrower, consequently, it has been difficult to increase production efficiency and reduce production cost.

In order to solve these problems, a method has been proposed in which a precision microspace is formed by way of laying a film for a top board on a substratum, on which surface a precision microscopic depressed portion is formed, by use of a contacting member so as to lay on the substratum.

Figure 1:
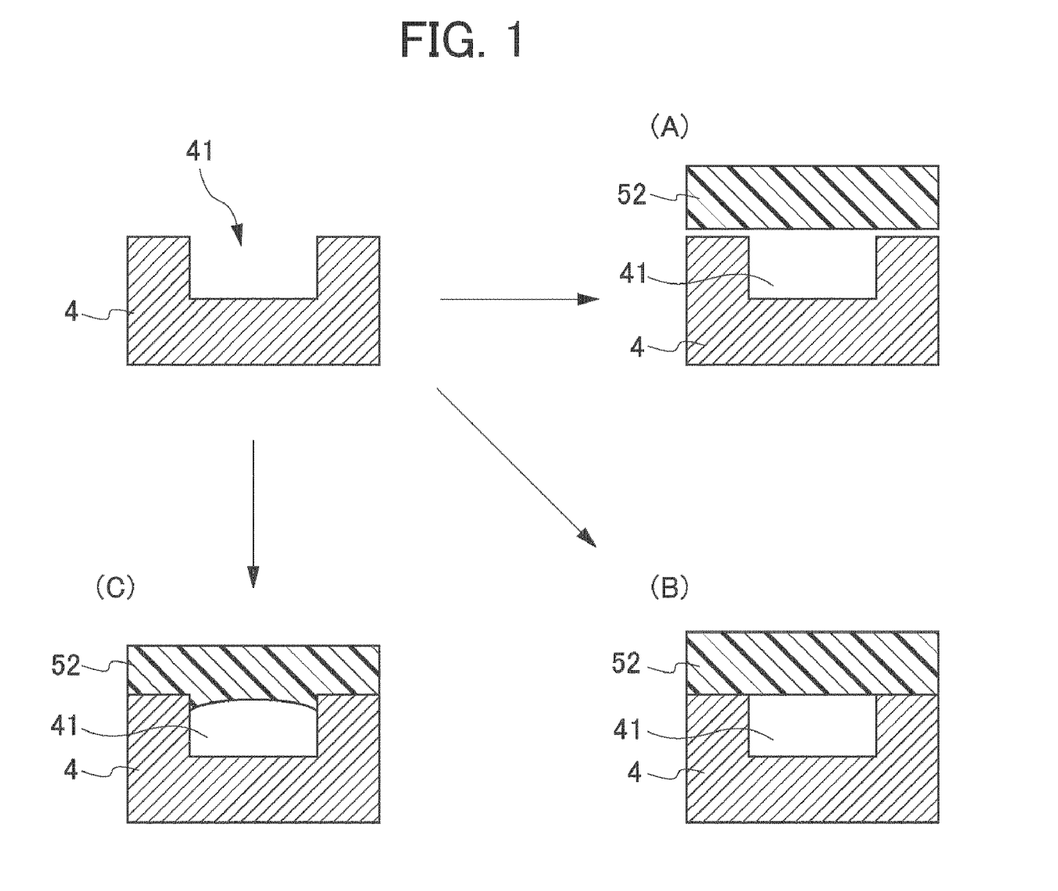
FIG. 1 is a view that represents a configuration of a precision microspace.

However, there exists a problem in that constant control of the configuration and volume of the precision microspace is difficult since if compliance and adhesiveness are enhanced when films are laid on substrata having a precision microscopic depressed portion, films occasionally enter into the precision microscopic depressed portion as shown in FIG. 1 (C).

There also exists a problem that the configuration and volume of precision microspace are not constant between central and periphery portions of substrata even though travel speed of contacting portions is constant since unit contact areas of contact portions, where contact is made with substrata and films, are different between central and periphery portions of substrata. That is, even when central portions of substrata represent a precision microscopic depressed portion as shown in FIG. 1 (B), periphery portions tend to receive excessive pressure due to smaller contact areas of contact portions, where contact is made with substrata and films, therefore, there exists a problem that films enter into the precision microscopic depressed portion as shown in FIG. 1 (C).

When precision microspaces are used for liquid-ejecting devices etc. in particular, it is required that configuration and volume of precision microspaces are constant. In addition, when the precision microspaces are formed after inserting parts etc. into the precision microspaces, contact between films and parts may cause troubles such as non-working of parts. It is therefore ideal that all precision microspaces in the substrata represent a shape that no film invades the precision microspaces as shown in FIG. 1 (B). On the other hand, if compliance and adhesiveness are weakened or pressure per unit contact area is lowered at contacting portions where substrata and films contact, the adhesion force weakens between substrata having a precision microscopic depressed portion and film as shown in FIG. 1 (A), resulting in peeling of the film.

In view of the problems described above, it is an object of the present invention to provide a method of forming a precision microspace in which configuration and volume of the precision microspace are constant, a process for manufacturing a member having a precision microspace, and a photosensitive laminated film for a top board of the precision microscopic depressed portion.

Means for Solving the Problems

The present inventors have thoroughly investigated to solve the problems described above. As a result, it has been discovered that invasion of film into the precision microscopic depressed portion can be excluded by way of making an uppermost face of a second stage, covering an outer circumference of a first stage on which a substratum is to be mounted, higher than an uppermost face of the first stage, or maintaining constant pressure per unit contact area at contacting portions where substrata and film contact, thereby achieving the present invention. More specifically, the present invention provides the following.

In a first aspect of the present invention, a method of forming a precision microspace is provided that has a step of laying a film on a substratum having a precision microscopic depressed portion, in which the method of forming a precision microspace includes a step of mounting the substratum on a first stage and setting an uppermost face of a second stage, covering an outer circumference of a first stage, to be higher than an uppermost face of the first stage and a step of laying a film on the substratum.

Sag of the film can be prevented when the film is laid on the substratum by way of making the uppermost face of the second stage higher than the uppermost face of the first stage, and thus the precision microspace can be formed with given configuration and volume.

In this connection, the term "substratum having a precision microscopic depressed portion" refers to a substratum having a surface on which at least one precision microscopic depressed portion is formed.

In a second aspect of the present invention, a method of forming a precision microspace is provided that has a step of laying a film on a substratum having a precision microscopic depressed portion, in which the step of laying a film is a step where the laying is carried out while constantly controlling the pressure per unit contact area at contacting portions where the substratum and the film contact.

In accordance with this forming method, the configuration and volume of the precision microspace at periphery portions of the substratum and of the precision microspace at central portions of the substratum can be made constant by laying while constantly controlling the pressure per unit contact area at contacting portions where the substratum and the film contact.

In this connection, the term "pressure per unit contact area" refers to a pressure that is obtained by dividing a pressure at a contact portion by an area of the contact portion where the substratum contacts directly with the film when the substratum and the film are contacted to lay the film on the substratum.

In a third aspect of the present invention, a photosensitive laminated film is provided that is used for the abovementioned method of forming a precision microspace, in which the photosensitive laminated film includes a laminate of a photosensitive composition layer and a support film.

Deformation of the photosensitive composition layer can be prevented by use of the photosensitive laminated film, and precision microspaces with given configuration and volume can be effectively provided.

In a fourth aspect of the present invention, a process for manufacturing a member having a precision microspace is provided that has a step of laying a film on a substratum having a precision microspace, in which the process for manufacturing a member having a precision microspace includes mounting the substratum on a first stage, setting an uppermost face of a second stage, covering an outer circumference of the first stage, to be higher than an uppermost face of the first stage, and laying the film on the substratum.

In accordance with the process for manufacturing a member having a precision microspace of the present invention, sag of the film can be prevented when the film is laid on the substratum, and thus the member can be manufactured with the precision microspace having given configuration and volume.

In a fifth aspect of the present invention, a process for manufacturing a member having a precision microspace is provided that has a step of laying a film on a substratum having a precision microspace, in which the step of laying a film is a step of laying while constantly controlling the pressure per unit contact area at contacting portions where the substratum and the film contact.

In accordance with the process for manufacturing a member having a precision microspace of the present invention, the configuration and volume of the precision microspace at periphery portions of the substratum and of the precision microspace at central portions of the substratum can be made constant.

Effects of the Invention

In accordance with the present invention, sag of film can be eliminated when film is laid on a substratum by way of making an uppermost face of a second stage higher than an uppermost face of a first stage. Moreover, the configuration and volume of the precision microspace resulting from a precision microscopic depressed portion at central portions of substrata and of a precision microscopic depressed portion at periphery portions of substrata can be made constant by constantly controlling the pressure per unit contact area at contacting portions where substrata and films contact. Thereby the precision microspace with given configuration and volume can be effectively formed and members having the precision microspace with given configuration and volume can be effectively produced.

Moreover, in accordance with the present invention, top boards with superior dimensional accuracy can be easily formed by way of laying photosensitive laminated films on substrata followed by photo-curing. Moreover, precision microspaces can be easily formed with higher sensitivity, lower volume shrinkage at heat hardening, good dimensional stability, and multifunction by use of a photosensitive laminated film as a top board.

PREFERRED MODE FOR CARRYING OUT THE INVENTION

Figure 2A:
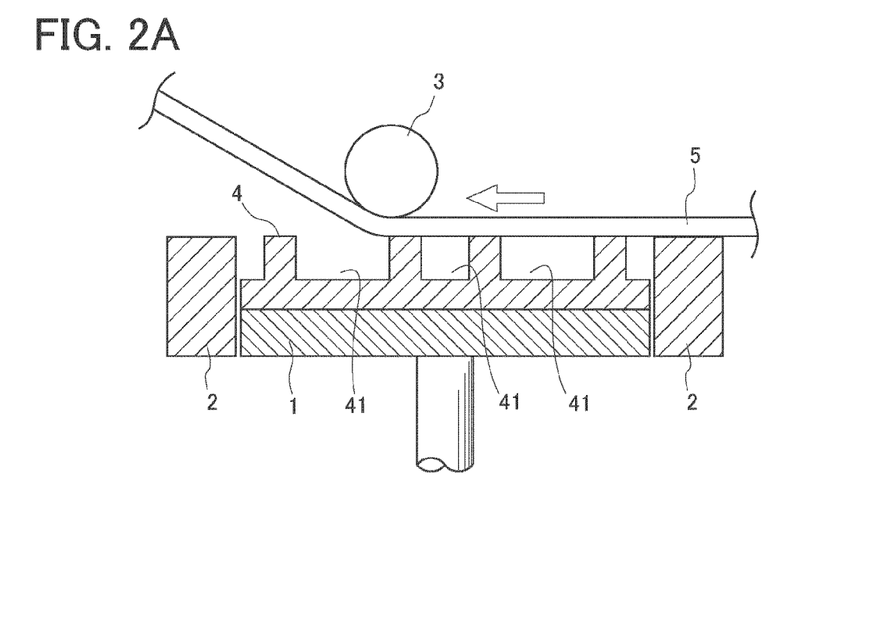
FIG. 2A is a cross section of a step in which a film is laid by applying pressure so as to cover a precision microscopic depressed portion.
Figure 2B:
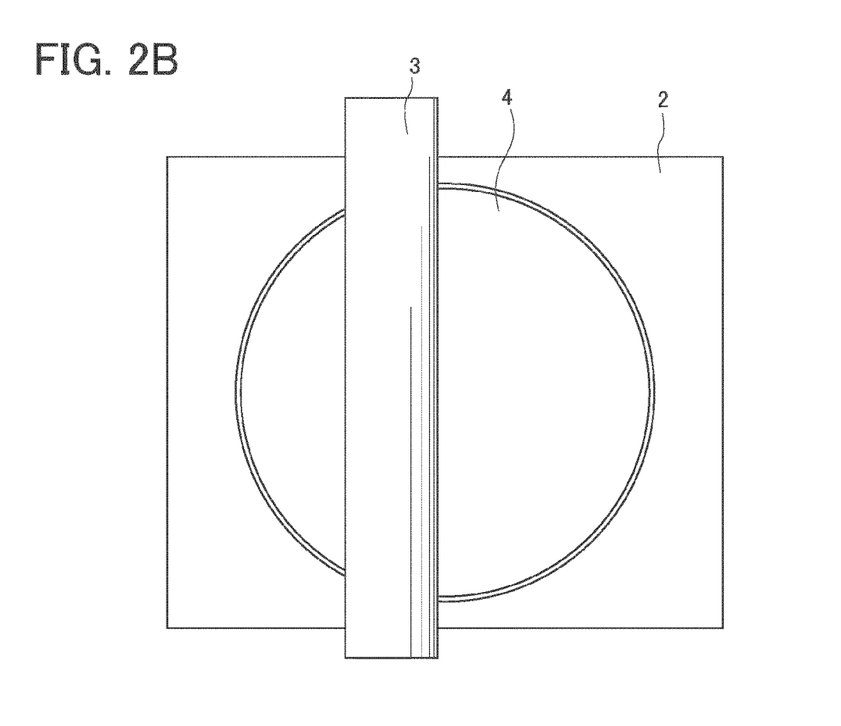
FIG. 2B is a plain view of a step in which a film is laid by applying pressure so as to cover a precision microscopic depressed portion.
Figure 3A:
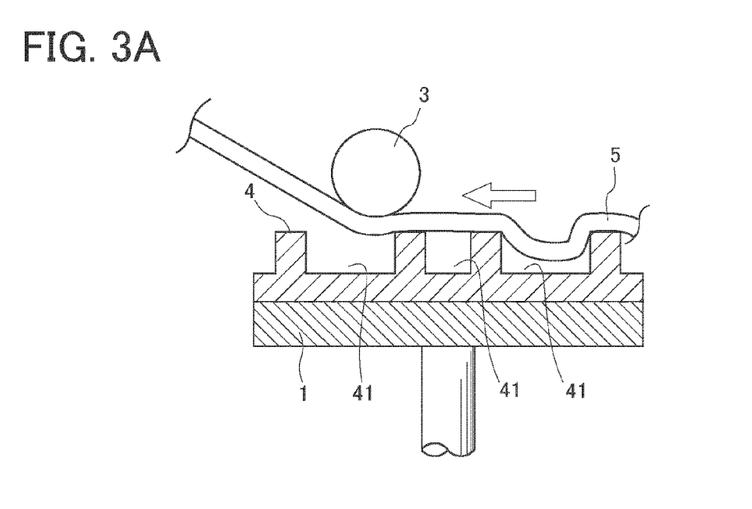
FIG. 3A is a cross section of a step in which a film is laid by applying pressure so as to cover a precision microscopic depressed portion in a case where no second stage is provided.
Figure 3B:
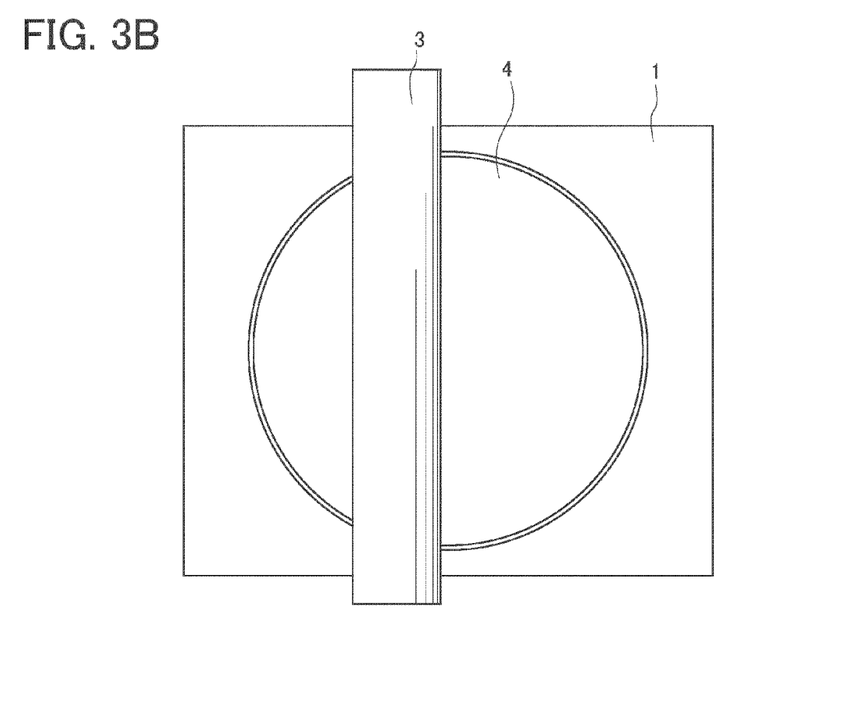
FIG. 3B is a plain view of a step in which a film is laid by applying pressure so as to cover a precision microscopic depressed portion in a case where no second stage is provided.

In a first embodiment of the present invention, as shown in FIGS. 2A and 2B, the uppermost face of the second stage 2, covering the outer circumference of the first stage 1 on which the substratum 4 having a precision microscopic depressed portion 41 is mounted, is set to be higher than the uppermost face of the first stage 1, and then a photosensitive laminated film 5 is laid by a contacting member 3. Thereby the problem can be solved where the configuration and volume of the precision microspace resulting from a precision microscopic depressed portion 41 provided to the substratum 4 cannot be constantly controlled due to the film 5 sagging on the substratum 4 as shown in FIGS. 3A and 3B, that is, the problem that the configuration and volume of the plurality of precision microspaces cannot be made constant, can be solved.

In addition, in a second embodiment of the present invention, the pressure per unit contact area is constantly controlled at contacting portions where the substratum 4 and the film 5 contact. Thereby the problem where the configuration and volume of the precision microspace resulting from the precision microscopic depressed portion 41 at central portions of the substratum 4 and of the precision microscopic depressed portion 41 at periphery portions of the substratum 4 cannot be constantly controlled, can be solved.

The present invention is explained in detail with respect to the embodiments in the following, but the present invention should nevertheless not be limited to the embodiments and can be carried out with appropriate changes within the scope of the purpose of the present invention. In this connection, an explanation is provided with respect to a case where the film is a photosensitive laminated film for convenience of the explanation; however, the present invention can be carried out under similar producing methods and forming methods, etc. even in a case where films other than the photosensitive laminated film are used, and which does not limit the purport of the invention.

Method of Forming Precision Microspace

Figure 4:
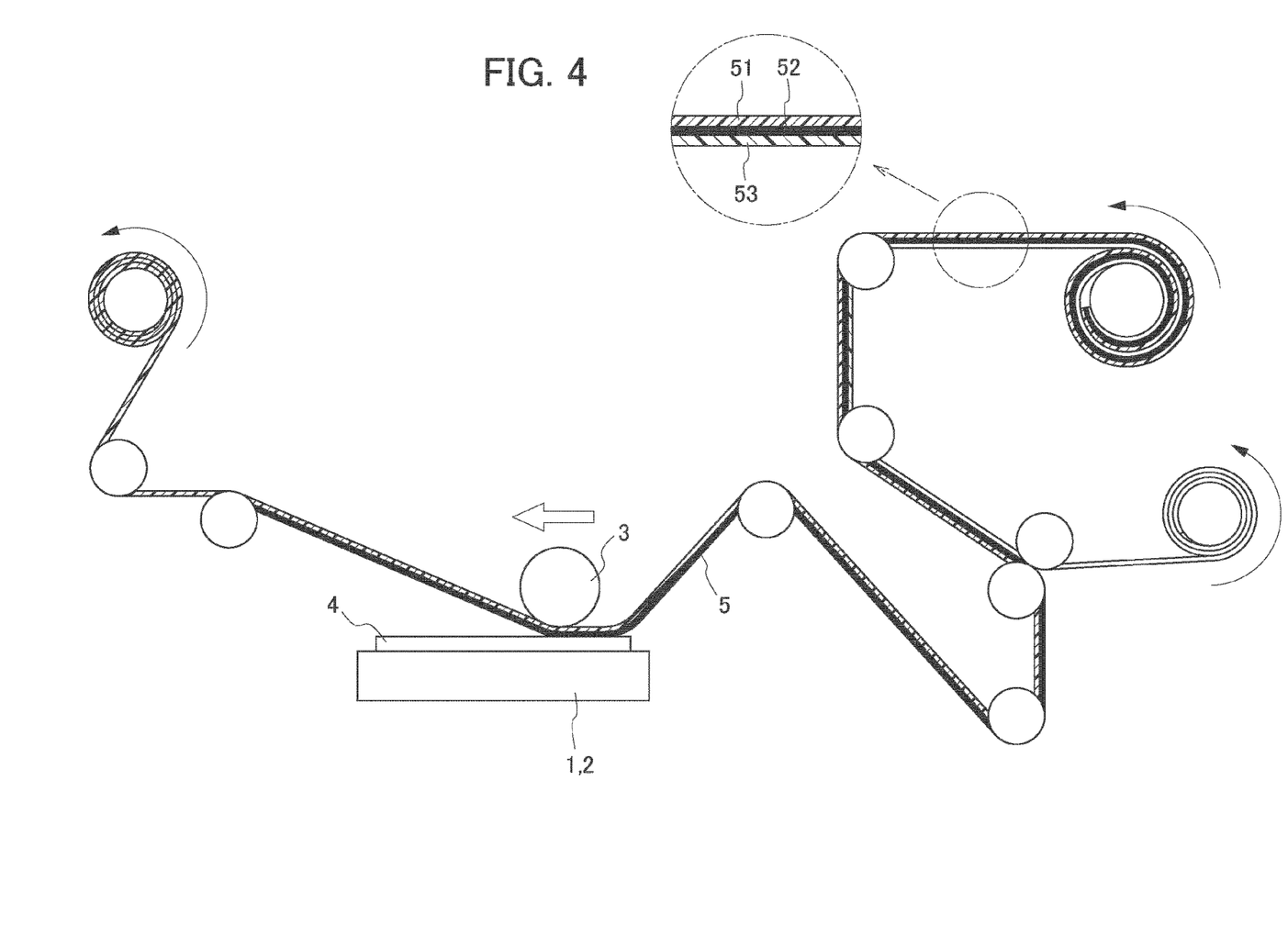
FIG. 4 is an entire flow chart of a step in which a film is laid by applying pressure so as to cover a precision microscopic depressed portion.

FIG. 4 is an entire flow chart of the method of forming a precision microspace and the process for manufacturing a member having a precision microspace of the present invention. In the following, the present invention is separately explained for the first and second embodiments.

First Embodiment

The substratum 4 with the precision microscopic depressed portion 41 is mounted on the first stage 1, and the second stage 2 covering the outer circumference of the first stage 1 is adjusted so that the uppermost face of the second stage 2 is higher than the uppermost face of the first stage 1. The photosensitive composition layer 52 in the photosensitive laminated film 5 becomes a top board of the precision microscopic depressed portion 41, and the photosensitive laminated film 5 is a laminate of the photosensitive composition layer 52, a support film 51 to support the photosensitive composition layer 52, and a protective film 53 to protect the photosensitive composition layer 52. In addition, a contacting member 3 is provided on the first stage 1 to lay the photosensitive laminated film 5 on the substratum 4. The photosensitive laminated film 5 may be laid on the substratum 4 through contacting with pressure by the contacting member 3 as required.

The precision microscopic depressed portion 41 to be formed in the substratum 4 may be appropriately formed using conventional technologies depending on the application, etc.; it is preferred that the precision microscopic depressed portion 41 is formed using a photoresist pattern in order to form a precision microspace with higher sensitivity, lower volume shrinkage upon heat curing, and higher accuracy.

The height (depth) of the precision microscopic depressed portion 41 is not particularly limited, but is preferably 0.1 μm to 1 mm, and the configuration etc. is not particularly limited. In addition, the precision microscopic depressed portion 41, which may be appropriately modified depending on the application etc., is a depressed portion of 1 mm or less wide and 1 mm or less deep. The member with the precision microspace may be applied to those formed in electronic parts such as SAW filters, liquid ejection heads such as inkjet heads, resist droplet-ejection heads, and DNA droplet-ejection heads and other micro pumps, micro light arrays, micro switches, micro relays, light switches, micro flow meters, and pressure sensors.

The photosensitive composition layer 52 is exposed by peeling the protective layer 53 to protect the photosensitive composition layer 52 on the way. The photosensitive laminated film 5 is put on the uppermost face of the second stage 2, which is adjusted to be higher than the uppermost face of the first stage 1, and then the photosensitive laminated film 5 is laid on the substratum 4 by the contacting member 3. The contacting member 3 is not particularly limited with respect to its configuration etc. as long as capable of laying the photosensitive laminated film 5 on the substratum 4; it is preferred that a roller is used in view of operating efficiency etc.

Figure 5:
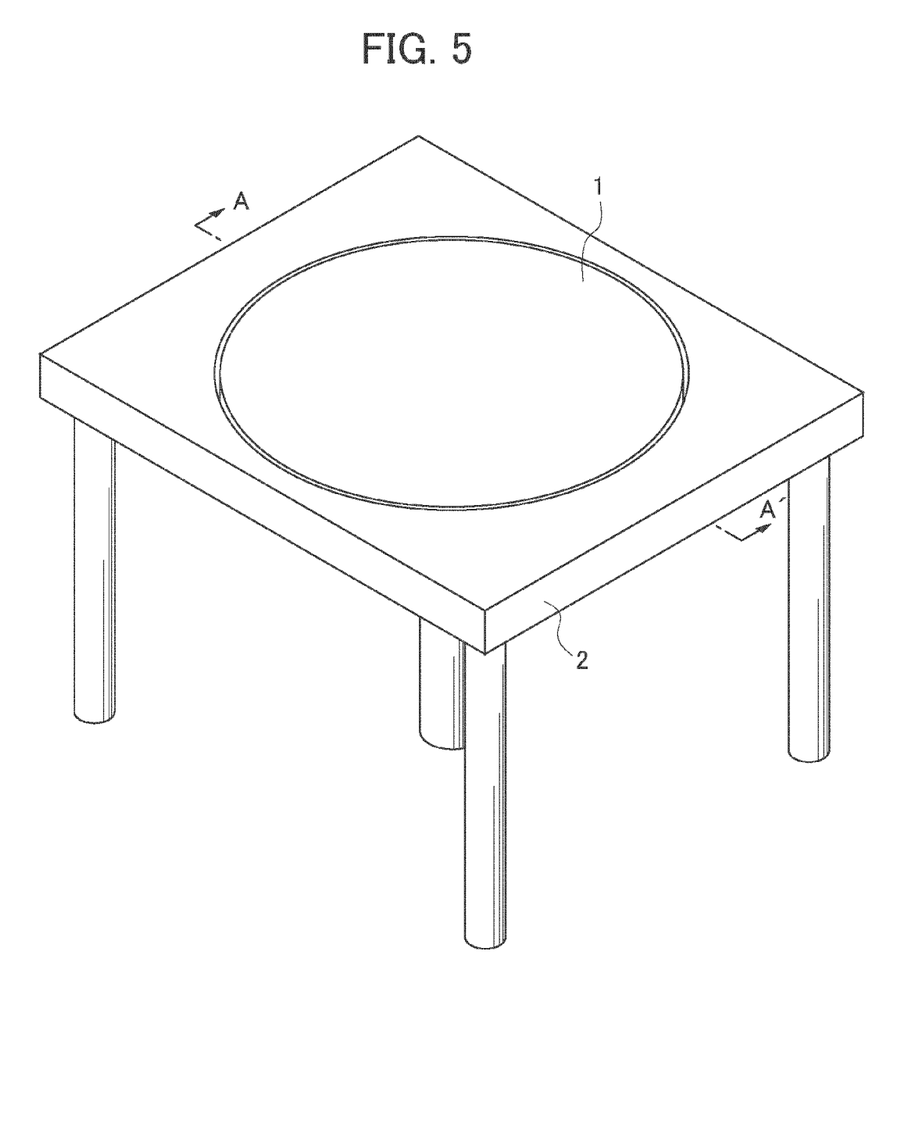
FIG. 5 is a cubic diagram of a first stage and a second stage that are used in the method of forming a precision microspace and the process for manufacturing a member with the precision microspace of the present invention.

FIG. 5 is a cubic diagram of the first stage 1 and the second stage 2 that are used in the method of forming a precision microspace and the process for manufacturing a member having a precision microspace of the present invention. The stages used in the present invention consist of the first stage 1 to mount the substratum 4 and the second stage 2 that is placed so as to cover the outer circumference of the first stage 1.

Material etc. of the first stage 1 and the second stage 2 is not particularly limited, and the materials of the first stage 1 and the second stage 2 may be different. The configuration of the first stage 1, which is circular in FIG. 1, may be appropriately changed to square, rhomboidal, etc. depending on the configuration of the substratum 4.

Figure 6:
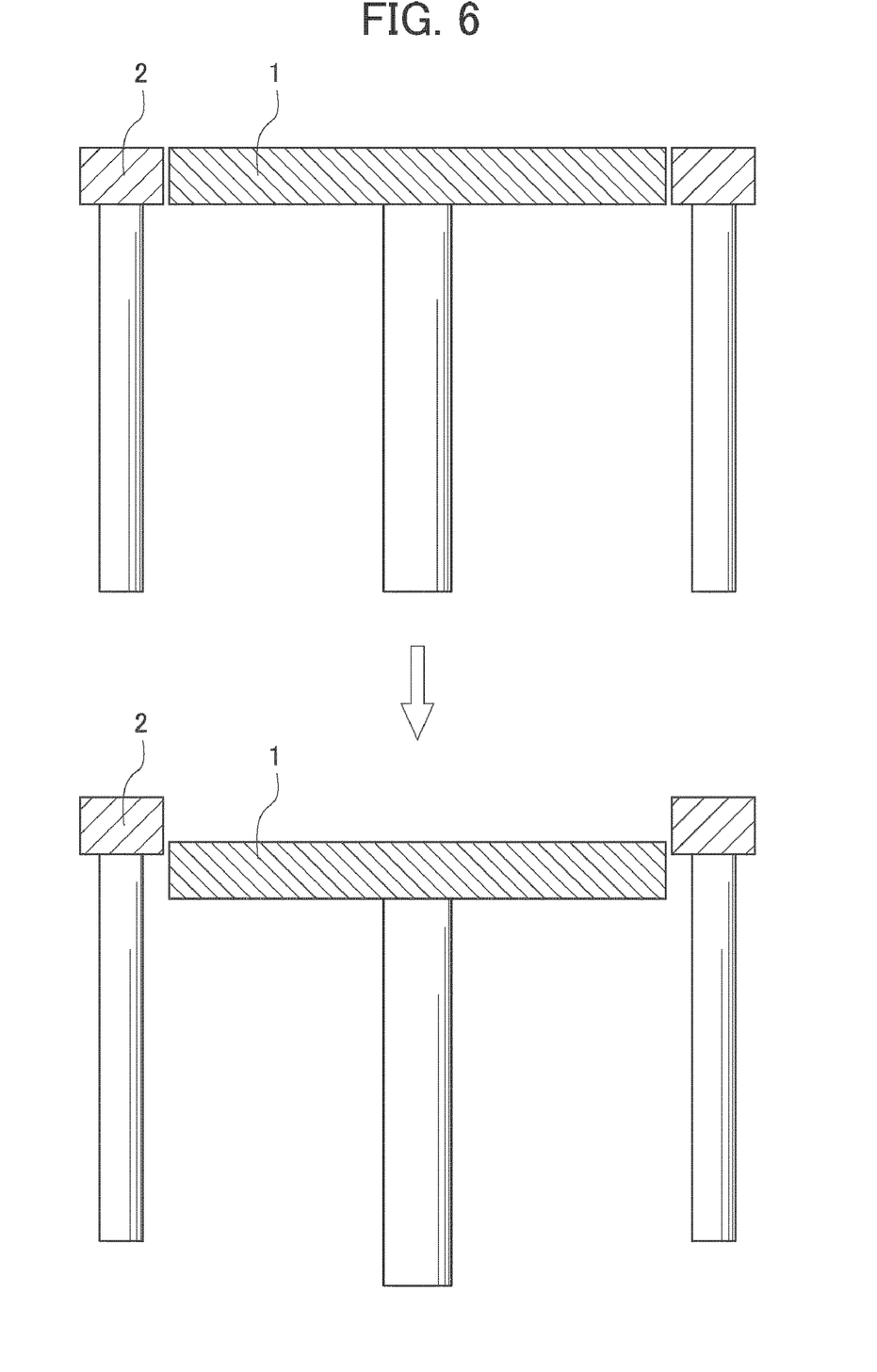
FIG. 6 is a cross section along a line of A-A' of FIG. 5.

FIG. 6 is a cross section along a line of A-A' in FIG. 5. As shown in FIG. 6, the uppermost face of the second stage 2 is adjusted to be higher than the uppermost face of the first stage 1. The method to adjust the uppermost face of the second stage 2 to be higher than the uppermost face of the first stage 1, which may be appropriately changed depending on the application etc., is exemplified by a method to vertically move up or down the first stage 1 or the second stage 2, a method to provide a gap member etc. on the second stage 2 to make the uppermost face of the second stage 2 higher than the uppermost face of the first stage 1, and the like.

The method to vertically move up or down the first stage 1 or the second stage 2 includes a method where the first stage 1 is fixed and only the second stage 2 is vertically moved up or down, a method where the second stage 2 is fixed and only the first stage 1 is vertically moved up or down, and a method where both of the first stage 1 and the second stage 2 are vertically moved up or down, and the like; these methods may be appropriately changed depending on the application etc.

It is preferred in the present invention that the uppermost face of the second stage 2 is adjusted so that the height is at least 0.1 μm and higher than the uppermost face of the first stage 1. The sag of the photosensitive laminated film 5 can be effectively prevented when the photosensitive laminated film 5 is laid on the substratum 4 by way of making the uppermost face of the second stage 2 at least 0.1 μm higher than the uppermost face of the first stage 1.

After adjusting the uppermost face of the second stage 2 to be higher than the uppermost face of the first stage 1, the photosensitive laminated film 5 is laid on the substratum 4.

In order to obtain the precision microspace and the member with the precision microspace as shown in FIG. 1 (B), the pressure applied when laying the photosensitive laminated film 5 on the substratum 4 by the contacting member 3 is preferably set to be 0.1 to 1 MPa, more preferably 0.3 to 0.6 MPa. By way of setting the pressure to at least 0.1 MPa, failure to form a precision microspace due to insufficient adhesion between the substratum 4 and the photosensitive laminated film 5 as shown in FIG. 1 (A) can be prevented. On the other hand, invasion of the photosensitive laminated film 5 into the precision microspace as shown in FIG. 1 (C) can be prevented by way of setting the pressure to 1 MPa or less.

The travel speed of the contacting member 3, when the photosensitive laminated film 5 is laid on the substratum 4, may be appropriately changed depending on the number of the precision microscopic depressed portion 41 provided by the substratum 4, etc., and preferably is 0.1 to 5 m/min. By way of setting the travel speed of the contacting member 3 to at least 0.1 m/min, invasion of the photosensitive laminated film 5 into the precision microspace as shown in FIG. 1 (C) can be prevented, and the plurality of the precision microscopic depressed portions 41 can be made constant in terms of the configuration and volume of their spaces. On the other hand, failure to form a precision microspace due to insufficient adhesion between the substratum 4 and the photosensitive laminated film 5 as shown in FIG. 1(A) can be prevented, and the plurality of the precision microscopic depressed portions 41 can be made constant in terms of volume of their spaces by way of setting the travel speed on the contacting member 3 to 5 m/min or less.

The temperature of the contacting member 3 (roller temperature) and the temperature of the first stage 1, when the photosensitive laminated film 5 is laid on the substratum 4, may be appropriately changed depending on the number of the precision microscopic depressed portion 41 provided to the substratum 4, etc., and preferably are 20 to 80° C. By way of setting each temperature to 20° C. or higher, failure to form a precision microspace due to insufficient adhesion between the substratum 4 and the photosensitive laminated film 5 as shown in FIG. 1 (A) can be prevented, and the plurality of the precision microscopic depressed portions 41 can be made constant in terms of the configuration and volume of their spaces. On the other hand, invasion of the photosensitive laminated film 5 into the precision microspace as shown in FIG. 1 (C) can be prevented, and the plurality of the precision microscopic depressed portions 41 can be made constant in terms of configuration and volume of their spaces, by way of setting each temperature to 80° C. or lower.

After laying the photosensitive laminated film 5 on the substratum 4 by the contacting member 3, excessive photosensitive laminated film 5 not adhering to the substratum 4 is cut away. The substratum 4, to which the photosensitive laminated film 5 adheres, is taken out from the first stage 1, and the photosensitive composition layer 52 is irradiated through the support film 51 and then heat-treated to cure the photosensitive composition layer 52. Subsequently, the support film 51 is peeled from the cured photosensitive composition layer 52, the cured photosensitive composition layer 52 is heat-treated again to practically cure, the top board is formed above the precision microscopic depressed portion 41, and the precision microspace is formed. In this connection, curing temperature to cure the photosensitive composition layer 52 and heating temperature at heat-treatment, etc. may be appropriately changed depending on the material used for the photosensitive composition layer 52, etc. In addition, when the precision microspace is formed using other than the photosensitive laminated film 5, etc., the steps of heat-treatment and curing of the photosensitive composition layer 52 may be eliminated as required.

Second Embodiment

The substratum 4 with the precision microscopic depressed portion 41 is mounted on the first stage 1. The photosensitive composition layer 52 in the photosensitive laminated film 5 becomes a top board of the precision microscopic depressed portion 41, and the photosensitive laminated film 5 is a laminate of the photosensitive composition layer 52, a support film 51 to support the photosensitive composition layer 52, and a protective film 53 to protect the photosensitive composition layer 52. In addition, a contacting member 3 is provided on the first stage 1 to lay the photosensitive laminated film 5 on the substratum 4. The photosensitive laminated film 5 may be laid on the substratum 4 through contacting with pressure by the contacting member 3 as required.

The method to form the precision microscopic depressed portion 41 formed on the substratum 4 and the height (depth) of the precision microscopic depressed portion 41 may be similar to those of the first embodiment described above.

Figure 7:
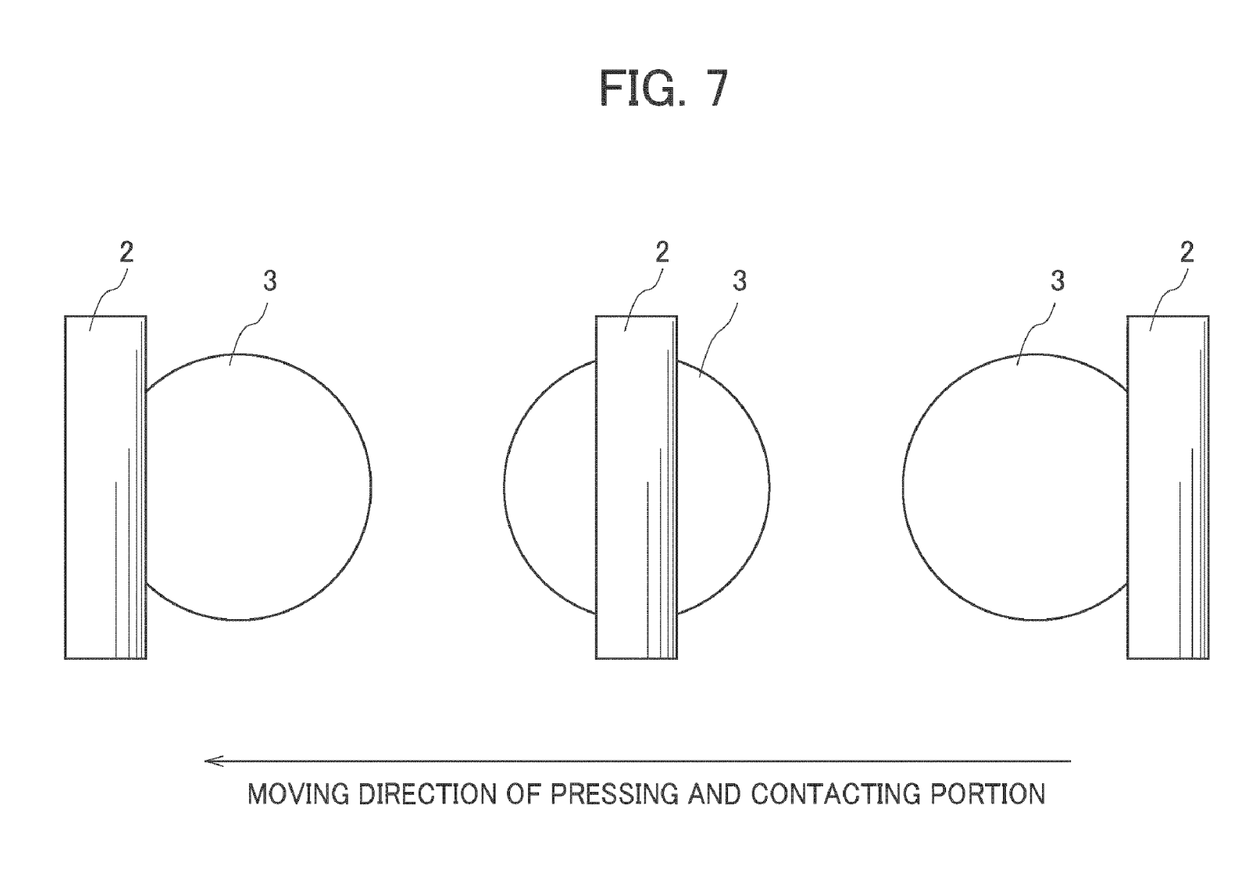
FIG. 7 is a view that shows a condition to lay a film while moving a contacting portion on a substratum and a film.

FIG. 7 is a view that shows a condition to lay the photosensitive laminated film 5 on the substratum 4 while moving the contacting member 3 on the substratum 4 and the photosensitive laminated film 5 by applying pressure. When the contacting member 3 is moved toward the central portion of the substratum 4 from the point to start laying (starting point) of the contact portion between the substratum and the photosensitive laminated film 5 (not shown), pressure per unit contact area will gradually decrease at contact portions where contact is made with the photosensitive laminated film 5, provided that the pressure is constant over the contact portions. That is, when the contact portion has reached the central portion of the substratum 4, the pressure per unit contact area reaches a minimum at the contact portion where contact is made with the photosensitive laminated film 5. Therefore, if the pressure at the contact portions is gradually increased from the starting point to the central portion, the pressure per unit contact area can be constantly controlled over the contact portions where contact is made with the photosensitive laminated film 5.

On the other hand, the pressure per unit contact area gradually increases at the contact portion where contact is made with the substratum 4 and the photosensitive laminated film 5, when the contact portion moves to the point to finish laying the photosensitive laminated film 5 on the substratum (end point) after the contact portion has reached the central portion, provided that the pressure is constant over the contact portions. That is, when the contact portion has reached the end point of the substratum 4, the pressure per unit contact area reaches a maximum at the contact portion where contact is made with the photosensitive laminated film 5. Therefore, if the pressure at the contact portions is gradually decreased from the central portion to the end point, the pressure per unit contact area can be constantly controlled over the contact portions where contact is made with the photosensitive laminated film 5.

In this connection, FIG. 7 shows a case where the substratum 4 is circular; however, the substratum 4 is not limited to circular, and the pressure may be controlled so that the pressure per unit contact area is gradually increased from the starting point to the central portion at the contact portions where contact is made between the substratum 4 and the photosensitive laminated film 5 and the pressure per unit contact area is gradually decreased from the central portion to the end point at the contact portions where contact is made between the substratum 4 and the photosensitive laminated film 5.

The pressure per unit contact area at the contact portions, where the substratum 4 and the photosensitive laminated film 5 contact, is preferably 0.1 to 1 MPa/cm$^2$, more preferably 0.3 to 0.6 MPa/cm$^2$ in order to obtain the precision microspace and the member with the precision microspace as shown in FIG. 1 (B). By way of setting the pressure per unit contact area, at the contact portions where the substratum 4 and the photosensitive laminated film 5 contact, to no less than 0.1 MPa/cm$^2$, failure to form a precision microspace due to insufficient adhesion between the substratum 4 and the photosensitive laminated film 5 as shown in FIG. 1 (A) can be prevented. On the other hand, invasion of the photosensitive laminated film 5 into the precision microspace as shown in FIG. 1 (C) can be prevented, by way of setting the pressure per unit contact area, at the contact portions where the substratum 4 and the photosensitive laminated film 5 contact, to no higher than 1 MPa/cm$^2$.

The travel speed of the contacting member 3, the temperature of the contacting member 3 (roller temperature) and the temperature of the first stage 1 when the photosensitive laminated film 5 is laid on the substratum 4 may be similar to those of the first embodiment.

After laying the photosensitive laminated film 5 on the substratum 4 by the contacting member 3, similarly as the first embodiment described above, the excessive photosensitive laminated film 5 not adhering to the substratum 4 is cut away. The substratum 4, to which the photosensitive laminated film 5 adheres, is taken out from the first stage 1, and the photosensitive composition layer 52 is irradiated through the support film 51 and then heat-treated to cure the photosensitive composition layer 52. Subsequently, the support film 51 is peeled from the cured photosensitive composition layer 52, the cured photosensitive composition layer 52 is heat-treated again to practically cure, the top board is formed above the precision microscopic depressed portion 41, and the precision microspace is formed. In this connection, curing temperature to cure the photosensitive composition layer 52 and heating temperature at heat-treatment, etc. may be appropriately changed depending on the material used for the photosensitive composition layer 52, etc. In addition, when the precision microspace is formed using other than the photosensitive laminated film 5, etc., the steps of heat-treatment and curing of the photosensitive composition layer 52 may be eliminated as required.

Photosensitive Laminated Film

In the photosensitive laminated film 5 used in the present invention, the photosensitive composition layer 52 becomes the top board of the precision microscopic depressed portion 41; more preferably, a member having a precision microspace with superior dimensional accuracy can be produced by way of exposing, curing, etc. the photosensitive composition layer 52.

As described above, the support film 51, the photosensitive composition layer 52, and the protective film 53 are laminated sequentially in the photosensitive laminated film 5 used in the present invention. Conventional various films can be used for the protective film 53, such as polyethylene terephthalate film, polypropylene film, and polyethylene film; these may be used alone or in combination of two or more. In this connection, the protective film 53 may not be laminated as required.

The photosensitive composition constituting the photosensitive composition layer 52 is preferably a chemical amplification-type negative-type photosensitive composition.

Preferably, the photosensitive resin composition constituting the photosensitive composition layer 52, favorably used for the photosensitive laminated film 5 of the present invention, is a photosensitive resin composition that contains a multifunctional epoxy resin and a cationic polymerization initiator. By way of combining a multifunctional epoxy resin and a cationic polymerization initiator, the precision microspace can be formed with higher sensitivity, lower volume shrinkage upon heat curing, and higher accuracy. Various combinations are possible from these; among others, the combination of 8-functional bisphenol A novolac-type epoxy resin (produced by Japan Epoxy Resin Co., product name: Epicoat 157S70) and 4-{4-(2-chlorobenzoyl)phenylthio}phenyl bis(4-fluorophenyl)sulfonium hexafluoroantimonate (produced by Asahi Denka Co., product name: Adeka Optomer SP-172, supplied) is most preferable in particular.

Cationic polymerization initiator may be included in a lower amount by virtue of higher cation-generating efficiency upon irradiation, and combination thereof with a multifunctional epoxy resin may lead to significantly higher sensitivity of the photosensitive composition layer 52. In addition, the cationic polymerization initiator has a superior effect by virtue of specific compatibility with a multifunctional epoxy resin such that the initiator can effectively attack the multifunctional epoxy resin, in particular epoxy group in molecules of multifunctional bisphenol A novolac-type epoxy resin to progress polymerization. Furthermore, the combination has an effect that volume shrinkage of the photosensitive composition layer 52 is decreased upon heat curing. Accordingly, when the photosensitive composition layer 52 employing such photosensitive resin composition is used, the top board of the precision microspace can be formed with superior dimensional accuracy, and thus the precision microspace can be formed with given configuration and volume, and a member can be produced that has the precision microspace with given configuration and volume.

The cationic polymerization initiator to be incorporated into the photosensitive composition layer 52 is a compound that generates a cation upon irradiation with UV ray, far-UV ray, excimer laser such as of KrF and ArF, radiation such as X ray and electron beam, etc., and the cation can come to a polymerization initiator; specific examples thereof include at least one selected from aromatic diazonium salts, aromatic sulfonium salts, aromatic iodonium salts, metallocene compounds, aromatic phosphonium salts, and silanol-aluminum complexes; these may be used alone or in combination of two or more.

Examples of the cationic polymerization initiator, more specifically the cationic polymerization initiator of aromatic sulfonium salt, include 4-(4-benzoylphenylthio)phenyl diphenyl sulfonium hexafluoroantimonate, 4-(4-benzoylphenylthio)phenylbis(4-hydroxyethyloxy phenyl)sulfonium hexafluoroantimonate, 4-(4-benzoylphenylthio)phenyl bis(4-fluorophenyl)sulfonium hexafluoroantimonate, 4-(4-benzoylphenylthio)phenylbis(4-chlorophenyl)sulfonium hexafluoroantimonate, 4-{4-(3-chlorobenzoyl)phenylthio}phenyl bis(4-fluorophenyl)sulfonium hexafluoroantimonate, 4-(4-benzoylphenylthio)phenyl bis(4-methylphenyl)sulfonium hexafluoroantimonate, 4-(4- benzoylphenylthio)phenyl bis(4-hydroxyethylphenyl)sulfonium hexafluoroantimonate, 4-{4-(4-hydroxyethyloxybenzoyl)phenylthio}phenyl bis(4-fluorophenyl)sulfonium hexafluoroantimonate, 4-{4-(4-hydroxyethyloxybenzoyl)phenylthio}phenyl diphenylsulfonium hexafluoroantimonate, 4-{4-(4-hydroxyethyloxy benzoyl) phenylthio}phenyl bis(4-hydroxyethyloxy phenyl)sulfonium hexafluoroantimonate, 4-(4-benzoylphenylthio)phenyl bis(4-methoxyethoxy phenyl)sulfonium hexafluoroantimonate, 4-{4-(3-methoxybenzoyl)phenylthio}phenyl diphenyl sulfonium hexafluoroantimonate, 4-{4-(3-methoxycarbonyl benzoyl)phenylthio}phenyldiphenyl sulfonium hexafluoroantimonate, 4-{4-(2-hydroxymethyl benzoyl)phenylthio}phenyldiphenyl sulfonium hexafluoroantimonate, 4-{4-(4-methylbenzoyl) phenylthio}phenyl bis(4-fluorophenyl)sulfonium hexafluoroantimonate, 4-{4-(4-methoxybenzoyl) phenylthio}phenylbis(4-fluorophenyl)sulfonium hexafluoroantimonate, 4-{4-(4-fluorobenzoyl) phenylthio}phenyl bis(4-fluorophenyl)sulfonium hexafluoroantimonate, 4-{4-(2-methoxycarbonylbenzoyl) phenylthio}phenyl bis(4-fluorophenyl)sulfonium hexafluoroantimonate, bis[4-(diphenylsulfonio)phenyl]sulfide bishexafluorophosphate, bis[4-(diphenylsulfonio)phenyl]sulfide bistetrafluoroborate, bis[4-(diphenylsulfonio)phenyl]sulfide tetrakis(pentafluorophenyl)borate, diphenyl-4-(phenylthio)phenylsulfonium hexafluorophosphate, diphenyl-4-(phenylthio)phenylsulfonium tetrafluoroborate, diphenyl-4-(phenylthio)phenylsulfonium tetrakis(pentafluorophenyl)borate, triphenylsulfonium hexafluorophosphate, triphenylsulfonium hexafluoroantimonate, triphenylsulfonium tetrafluoroborate, triphenyl sulfonium tetrakis(pentafluorophenyl)borate, bis[4-(di(4-(2-hydroxyethoxy))phenyl sulfonio)phenyl]sulfide bishexafluorophosphate, bis[4-(di(4-(2-hydroxyethoxy))phenyl sulfonio)phenyl]sulfide bistetrafluoroborate, bis[4-(di(4-(2-hydroxyethoxy))phenyl sulfonio)phenyl]sulfide tetrakis(pentafluorophenyl)borate, etc. Among these compounds, 4-(4-benzoylphenylthio)phenyl diphenylsulfonium hexafluoroantimonate, 4-(4-benzoylphenylthio)phenyl bis(4-hydroxyethyloxy phenyl)sulfonium hexafluoroantimonate, 4-(4-benzoylphenylthio)phenyl bis(4-fluorophenyl)sulfonium hexafluoroantimonate, 4-(4-benzoylphenylthio)phenyl bis(4-chlorophenyl)sulfonium hexafluoroantimonate, and 4-{4-(3-chlorobenzoyl)phenylthio}phenyl bis(4-fluorophenyl)sulfonium hexafluoroantimonate are more preferable, and Adeka Optomer SP-172 (4-{4-(2-chlorobenzoyl)phenylthio}phenyl bis(4-fluorophenyl)sulfonium hexafluoroantimonate) produced by Asahi Denka Co., Adeka Optomer SP-170 produced by Asahi Denka Co. are preferably used; these may be used alone or in combination of two or more.

Examples of the cationic polymerization initiator of iodonium salt include diphenyliodonium hexafluorophosphate, diphenyliodonium hexafluoroantimonate, diphenyliodonium tetrafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyl iodonium hexafluorophosphate, 4-methylphenyl-4-(1-methylethyl)phenyl iodonium hexafluoroantimonate, 4-methylphenyl-4-(1-methylethyl)phenyl iodonium tetrafluoroborate, 4-methylphenyl-4-(1-methylethyl)phenyl iodonium tetrakis(pentafluorophenyl)borate, etc. Among these compounds, DI-1, DI-2 of Ciba Specialty Chemicals Inc. are preferably used; these may be used in combination of two or more.

Examples of the cationic polymerization initiator of diazonium salt include phenyldiazonium hexafluorophosphate, phenyldiazonium hexafluoroantimonate, phenyldiazonium tetrafluoroborate, phenyldiazonium tetrakis(pentafluorophenyl)borate, etc.; these may be used alone or in combination of two or more.

When the composition ratio of the cationic polymerization initiator is excessively large in the photosensitive composition layer 52, development of the photosensitive composition layer 52 becomes difficult; reversely, when the composition ratio is excessively small, the curing period of the photosensitive composition layer 52 becomes longer under radiation exposure. Considering these matters, the composition ratio of the cationic polymerization initiator is preferably 0.1% to 10%, more preferably 0.5% to 5%.

The photosensitive resin composition constituting the photosensitive composition layer 52 may also contain a polymer of linear two-functional epoxy resin in order to improve film formability.

The photosensitive resin composition constituting the photosensitive composition layer 52 may also contain a naphthol-type sensitizer. When the sensitivity is higher and there exists a gap between a mask and resist face, exposure results in a phenomenon that size of resulting resin patterns is thicker than mask size; however, inclusion of the naphthol-type sensitizer may suppress the thickening phenomenon without lowering sensitivity. It is preferable to add the naphthol-type sensitizer in this way because an error of the resist pattern dimension for the mask pattern dimension may be reduced.

Examples of the naphthol-type sensitizer include 1-naphthol, β-naphthol, α-naphthol methylether, α-naphthol ethylether, etc., and 1-naphthol is preferably used in view of the effect to suppress the resist thickening without lowering sensitivity.

It is not preferable that composition ratio of the naphthol-type sensitizer is excessively high in the photosensitive composition layer 52 from the viewpoint of tendency toward reverse-taper configuration and excessively thin line width. Considering these matters, the composition ratio of the naphthol-type sensitizer is preferably 0% to 10%, more preferably 0.1% to 3%.

The photosensitive resin composition constituting the photosensitive composition layer 52 may also contain a solvent. Sensitivity of the photosensitive composition layer 52 may be enhanced by way of incorporating a solvent. Examples of such solvent include propylene glycol monomethyl ether acetate (hereinafter, referred to as "PGMEA"), methyl isobutyl ketone (hereinafter, referred to as "MIBK"), butyl acetate, methyl amyl ketone (2-heptanone), ethyl acetate, methyl ethyl ketone (hereinafter, referred to as "MEK"), etc.; these may be used alone or in combination of two or more.

In cases of liquid resist, γ-butyrolactone is preferably used for the solvent from the viewpoint that the solvent is allowed to react to be incorporated into the resist; and considering formability into dry film, PGMEA, MIBK, butyl acetate, MEK, etc. are preferably used in view of wettability and surface tension with the substratum 4.

The photosensitive resin composition constituting the photosensitive composition layer 52 may also contain an oxetane derivative and an epoxy derivative. Flexibility of the photosensitive composition layer 52 prior to curing may be enhanced without degrading the properties of the photosensitive composition layer 52 after curing by way of incorporating an oxetane derivative or an epoxy derivative when shaped into a dry film. Examples of such oxetane derivative, not particularly limited thereto, include 3-ethyl-3-hydroxymethyl oxetane, 1,4-bis[{(3-ethyl-3-oxetanyl)

methoxy}methyl]benzene, di[1-ethyl(3-oxetanyl)]methyl-ether, etc.; these may be used in combination of two or more. In addition, the epoxy derivative is exemplified by bisphenol A-type epoxy resins, bisphenol F-type epoxy resins, etc. having an average molecular weight of 7000 or less, preferably 2000 or less, and more preferably 1000 or less. Specific example is a bisphenol A-type epoxy resin (produced by Japan Epoxy Resins Co., "Epicoat 828, average molecular weight: 380).

The photosensitive composition layer 52 used for the photosensitive laminated film 5 of the present invention may be further added and included appropriately with conventional miscible additives such as additional resins, plasticizers, stabilizers, colorants, surfactants, etc. to improve pattern quality, as required.

Thickness of the photosensitive composition layer 52, which may be appropriately changed depending on the application etc., is preferably 2 to 500 µm, more preferably 5 to 200 µm.

One way to produce the photosensitive laminated film 5 from the photosensitive composition layer 52 is that the photosensitive composition layer 52 is formed into a both side-protected dry film by a resin film and laminated to the substratum 4 with an intended precision microscopic depressed portion 41 prior to pattern exposure.

The support film 51 supports the photosensitive composition layer 52 from before exposure till complete curing of the photosensitive composition layer 52. That is, deformation of the photosensitive composition layer 52 is prevented. For the purpose, it is necessary to have a predetermined heat shrinkage rate, a predetermined thickness, and a predetermined haze value.

It is preferred that a resin film having a longitudinal shrinkage rate of 0.01% to 1% upon heating at 100° C. for 30 minutes is used as the support film 51, more preferably, a resin film having a longitudinal shrinkage rate of 4% or less upon heating at 150° C. for 30 minutes or a longitudinal shrinkage rate of 3% or less upon heating at 200° C. for 10 minutes is used. In this connection, by way of setting the longitudinal shrinkage rate to at least 0.01% to 1%, deformation of the photosensitive composition layer 52 can be prevented. In addition, the thickness is preferably 6 to 350 µm, more preferably 10 to 100 µm. Furthermore, the haze value is preferably 0.1 to 5, more preferably 0.1 to 3 (at film thickness of 30 µm). In regards to the material of the support film 51, specifically, polyethylene terephthalate is preferable, and other polyethylene, polypropylene, etc. may be useful. It is preferred that the support film 51 is release-treated so as to be easily separable as required.

Process for Manufacturing Member with Precision Microspace

An excellent resin pattern, which is equivalent with a mask pattern, can be formed, without depending on the configuration of the substratum 4 having a precision microscopic depressed portion 41, by way that the photosensitive laminated film 5 with the photosensitive composition layer 52 is laid on the substratum with an intended precision microscopic depressed portion 41, then the photosensitive composition layer 52 is pattern-exposed by radiation, followed by promoting the curing by applying heat, peeling the support film 51, and developing with a developer. Consequently, the precision microspace can be formed with given configuration and volume, and the member can be manufactured that has the precision microspace with given configuration and volume.

The method of forming a precision microspace and the process of manufacturing a member having a precision microspace of the present invention may be arranged such that the invention is attained by operating a predetermined program using computers such as personal computers. The program may be operated in a way that the program is recorded in recording media, capable of being read by computers, such as hard disks, CD-ROMs, and DVDs and is read out from the recording media by computers.

EXAMPLES

Hereinafter, examples of the present invention will be described. However, these examples are only provided for appropriately illustrating the present invention and do not intend to restrict the present invention at all.
Photosensitive Composition Layer 52

A photosensitive composition layer 52 was obtained by dissolving and mixing 100 parts by weight of an epoxy resin (JER157s70, produced by Japan Epoxy Resins Co.) and 3 parts by weight of an acid generator (Adeka Optomer SP 172, by Adeca Co.) in PGMEA. Film thickness of the photosensitive composition layer 52 was 30 µm.
Formation of Photosensitive Laminated Film 5

A photosensitive composition layer 52, prepared as described above, was uniformly coated on a support film 51, made of a lubricated polyethylene terephthalate film (Purex A53, manufactured by Teijin DuPont Films Japan Limited) and having a film thickness of 50 µm, and was dried at 65° C. for 5 minutes and 80° C. for 5 minutes by a warm-air convection dryer. Subsequently, a protective film 53, made of a lubricated polyethylene terephthalate film (Purex A31, manufactured by Teijin DuPont Films Japan Limited) and having a film thickness of 25 µm, was coated on the photosensitive composition layer 52 to form a photosensitive laminated film 5.

Example 1

A substratum 4 having a precision microscopic depressed portion 41 formed by a photoresist pattern was mounted on a first stage 1, and a second stage 2 covering the outer circumference of the first stage 1 was moved up or down to adjust the uppermost face of the second stage 2 to be 0.1 µm higher than the uppermost face of the first stage 1. The precision microscopic depressed portion 41 was 30 µm high (deep), 100 µm wide, and 100 µm long.

Next, the photosensitive laminated film 5 was laid (laminated) on the substratum 4 by way of fitting the photosensitive laminated film 5 along the uppermost face of the second stage 2 so as not making sag in the photosensitive laminated film 5 using a roller as a contacting member 3 at a roll temperature 50° C. of the roller and a travel speed of 0.5 m/min. Roller pressure was 0.5 MPa for laying the photosensitive laminated film 5 and the substratum 4.

Example 2

A circular substratum 4, having a precision microscopic depressed portion 41 formed by a photoresist pattern and a diameter of 300 nm, was mounted on a first stage 1. The precision microscopic depressed portion 41 was 30 µm high (deep), 100 µm wide, and 100 µm long.

Next, a photosensitive laminated film 5, of which the protective film 53 had been peeled away, was placed on a substratum 4 having a precision microscopic depressed portion 41. The photosensitive laminated film 5 was laid (laminated) on the substratum 4 using a roller as a contacting member 3 at a roll temperature 50° C. of the roller and a travel speed of 0.5 m/min so that the pressure per unit contact area is constant where the roller contacts the substratum 4 and the photosensitive laminated film 5. The width along which the roller contacts the photosensitive laminated film 5 was 1 mm at this time, and the pressure (P1) at the starting point and the end point was $1 \times 10^{-3}$ MPa, and the pressure (P2) at the central portion was 0.15 MPa.

The pressure Pa at the point "a", to which the roller had traveled 50 mm on the substratum 4, was $223.6 \times 10^{-3}$ MPa. In addition, the contact area Sa of the roller at the point, where the roller contacts with the photosensitive laminated film 5 after travelling 50 mm on the substratum 4, was 223.6 mm$^2$.

Therefore, the pressure per unit contact area, at the contacting portion where the substratum 4 and the photosensitive laminated film 5 contact at the point after the roller had traveled 50 mm on the substratum 4, was calculated by dividing the pressure Pa by the contact area Sa to obtain 0.1 MPa/cm$^2$.

The pressure P2 at the central portion of the substratum 4 was 0.15 MPa, and the contact area S was 300 mm$^2$. The pressure per unit contact area, at the contacting portion where contact is made with the photosensitive laminated film 5, was 0.1 MPa/cm$^2$ at the point where the roller had traveled at the central portion of the substratum 4, thus it is understood that the unit contact area at the contacting portion, where the substratum 4 and the photosensitive laminated film 5 contact, is constantly controlled at the point where the roller has traveled 50 mm on the substratum 4.

Evaluation of Precision Microspace

The photosensitive composition layer 52, of the photosensitive laminated film 5 laid on the substratum 4, was pattern-exposed (Proximity, GHI ray, light exposure: 400 mJ/cm$^2$) using a Parallel light aligner (mask aligner, manufactured by Canon Inc.). The patterning at this time was carried out so that the photosensitive composition layer 52 above the precision microscopic depressed portion 41 cures to block the precision microscopic depressed portion 41. Subsequently, heating (hereinafter, referred to as "PEB") at 90° C. for 5 minutes was applied with a hotplate. After peeling a support film 51 of the photosensitive laminated film 5, developing treatment was carried out for 4 minutes using PGMEA by a dipping process. Next, post bake was carried out for 1 hour at 200° C. using an oven to obtain a precision microspace. The pattern was such that upper part of the precision microscopic depressed portion 41 was blocked by the cured portion of the photosensitive composition layer 52. When the precision microspace was observed by a scanning electron microscope (SEM), it was found that all of the precision microspace within the member was a space as shown in FIG. 1 (B), and the configuration and the volume were constant.

Comparative Example 1

The Examples were similarly followed except that the second stage 2 covering the outer circumference of the first stage 1 was not moved up or down; and the uppermost face of the second stage 2 was not adjusted to be higher than the uppermost face of the substratum 4. When the precision microspace was observed by a scanning electron microscope (SEM), it was found that the configuration and the volume of the precision microspace were constant such that all of the precision microspace within the member was not of a space as shown in FIG. 1 (B), i.e. there were spaces as shown in FIG. 1 (C) and there were spaces as shown in FIG. 1 (A).

Comparative Example 2

The Examples were similarly followed except that the pressure per unit contact area at the contacting portion where the substratum 4 and the photosensitive laminated film 5 contact was not controlled to be constant. When the precision microspace was observed by a scanning electron microscope (SEM), it was found that the configuration and the volume of the precision microspace were constant such that all of the precision microspace within the member was not of a space as shown in FIG. 1 (B), i.e. there were spaces as shown in FIG. 1 (C) and there were spaces as shown in FIG. 1 (A).

The invention claimed is:

1. A method of forming a precision microspace by laying a film on a substratum having a precision microscopic depressed portion, said method comprising:
    mounting the substratum on a first stage;
    setting a second stage covering an outer circumference of the first stage so that an uppermost face of the second stage is higher than an uppermost face of the first stage;
    setting the uppermost face of the second stage covering the outer circumference of the first stage to be higher than the uppermost face of the first stage, wherein setting to be higher than the uppermost face of the first stage is achieved by vertically moving the first stage or the second stage up or down; and
    laying the film on the substratum.

2. A method of forming a precision microspace comprising laying a film on a substratum having a precision microscopic depressed portion, wherein the laying of the film is carried out while constantly controlling the pressure per unit contact area at a contacting portion where the substratum and the film contact, wherein the pressure at the contacting portion between the substratum and the film is gradually increased from a point where the laying of the film begins on the substratum toward a central portion therof and wherein the pressure at the contacting portion is gradually decreased from the central portion toward a point at which laying of the film on the substratum is finished.

3. The method of forming a precision microspace according to claim 2, wherein the pressure per unit contact area at the contacting portion where the substratum and the film contact is 0.1 to 1 MPa/cm$^2$.

4. The method of forming a precision microspace according to claim 1, wherein the height of the precision microscopic depressed portion is 0.1 μm to 1 mm.

5. The method of forming a precision microspace according to claim 1, wherein the precision microscopic depressed portion is formed by a photoresist pattern.

6. The method of forming a precision microspace according to claim 1, wherein the film is a photosensitive laminated film made by laminating a photosensitive composition layer on a support film.

7. The method of forming a precision microspace according to claim 6, further comprising, after laying the photosensitive laminated film on the substratum with the precision microscopic depressed portion, the steps of:
    exposing the photosensitive laminated film;
    heat-treating the exposed photosensitive laminated film;
    curing the photosensitive composition layer; and
    shaping a top board on the precision microscopic depressed portion to form a precision microspace.

8. A process for manufacturing a member having a precision microspace by laying a film on a substratum having a precision microscopic depressed portion, comprising mounting the substratum on a first stage and setting a second stage covering an outer circumference of the first stage so that an uppermost face of the second stage is higher than an uppermost face of the first stage, setting the uppermost face of the second stage covering the outer circumference of the first stage to be higher than the uppermost face of the first stage, wherein setting to be higher than the uppermost face of the first stage is achieved by vertically moving the first stage or the second stage up or down, and laying the film on the substratum.

9. A process for manufacturing a member having a precision microspace comprising laying a film on a substratum having a precision microscopic depressed portion, wherein the laying of the film is carried out while constantly controlling the pressure per unit contact area at a contacting portion where the substratum and the film contact, wherein the pressure at the contacting portion between the substratum and the film is gradually increased from a point where the laying of the film begins on the substratum toward a central portion therof and wherein the pressure at the contacting portion is gradually decreased from the central portion toward a point at which laying of the film on the substratum is finished.

10. The method of forming a precision microspace according to claim 2, wherein the height of the precision microscopic depressed portion is 0.1 μm to 1 mm.

11. The method of forming a precision microspace according to claim 2, wherein the precision microscopic depressed portion is formed by a photoresist pattern.

12. The method of forming a precision microspace according to claim 2, wherein the film is a photosensitive laminated film made by laminating a photosensitive composition layer on a support film.

13. The method of forming a precision microspace according to claim 12, further comprising, after laying the photosensitive laminated film on the substratum with the precision microscopic depressed portion, the steps of:
 exposing the photosensitive laminated film;
 heat-treating the exposed photosensitive laminated film;
 curing the photosensitive composition layer; and
 shaping a top board on the precision microscopic depressed portion to form a precision microspace.

* * * * *